US012693209B2

(12) United States Patent
Little et al.

(10) Patent No.: US 12,693,209 B2
(45) Date of Patent: Jul. 28, 2026

(54) OPTICAL SENSOR

(71) Applicant: Preddio Technologies Inc., North Andover, MA (US)

(72) Inventors: Maxwell Nicolaus Little, Newton, MA (US); Aaron T. Ganick, Boxford, MA (US)

(73) Assignee: Preddio Technologies Inc., North Andover, MA (US)

( * ) Notice: Subject to any disclaimer, the term of this patent is extended or adjusted under 35 U.S.C. 154(b) by 132 days.

(21) Appl. No.: 18/449,939

(22) Filed: Aug. 15, 2023

(65) Prior Publication Data

US 2024/0053255 A1 Feb. 15, 2024

Related U.S. Application Data

(60) Provisional application No. 63/371,467, filed on Aug. 15, 2022.

(51) Int. Cl.
*G01N 21/05* (2006.01)
*G01N 21/03* (2006.01)
*G01N 21/55* (2014.01)

(52) U.S. Cl.
CPC ......... *G01N 21/05* (2013.01); *G01N 21/0303* (2013.01); *G01N 21/55* (2013.01); *G01N 2021/058* (2013.01); *G01N 2021/558* (2013.01)

(58) Field of Classification Search
CPC ....... G01N 2021/058; G01N 2021/558; G01N 21/0303; G01N 21/05; G01N 21/251; G01N 21/532; G01N 21/55; G01N 21/8507
See application file for complete search history.

(56) References Cited

U.S. PATENT DOCUMENTS

| | | | |
|---|---|---|---|
| 2006/0078471 A1* | 4/2006 | Witty ..................... | G01N 21/05 |
| | | | 422/400 |
| 2012/0194805 A1* | 8/2012 | Ness ...................... | G01N 21/31 |
| | | | 356/213 |
| 2014/0134052 A1* | 5/2014 | Stevenson .......... | G01N 21/8483 |
| | | | 422/82.09 |
| 2018/0275052 A1* | 9/2018 | Walsh .................. | G01N 21/645 |
| 2022/0099545 A1* | 3/2022 | Maleev .................. | G01N 21/05 |

* cited by examiner

*Primary Examiner* — Hina F Ayub
(74) *Attorney, Agent, or Firm* — Husch Blackwell LLP

(57) ABSTRACT

An optical sensor for measuring fluid properties is provided. The optical sensor includes a channel configured to have a fluid flow therethrough; a light source provided on a first side of the channel; a first light detector provided on the first side of the channel; and a second light detector provided on a second side of the channel.

19 Claims, 9 Drawing Sheets

10

12

16

20

22

14

18

OPTICAL SENSOR

CROSS-REFERENCE TO RELATED APPLICATION

This application claims priority to U.S. Provisional Patent Application Ser. No. 63/371,467, filed on Aug. 15, 2022, entitled "Optical Sensor", the entire disclosure of which is incorporated herein by reference.

TECHNICAL FIELD

This disclosure generally relates to an optical sensor. More specifically, this disclosure relates to an optical sensor for use in the dairy industry.

BACKGROUND

Accurate inline measurement of milkfat content in raw milk has historically been a difficult task for dairy farms. In particular, dairy farms are often paid based on the fat content of the milk. Having fat content information in advance and without interrupting the existing processes of a dairy farm is thus useful and desirable.

However, milkfat content is typically measured in laboratories or during post-processing, where conditions are more controlled and milk solutions have already been homogenized or partially processed.

One factor that contributes to the difficulty of measuring the fat content of milk is the high turbidity, which is outside of the range of normal turbidity sensors designed to measure particulates such as impurities in water or cell counts of yeast. Existing turbidity sensors are usually designed to operate on processed milk that has been homogenized in a post-processing facility external to the dairy farm.

Moreover, raw milk presents additional challenges such as inhomogeneity as well as changes in non-fat particulates that occur as cows experience different seasons and diets. These confounding variables can cause turbidity to change without necessarily changing milkfat content, rendering turbidity measurements alone inaccurate.

Other problems with existing technology in the field include "sensor drift" or a gradual change in sensor output while conditions have not changed, which may be caused by sensor fouling or a decline in the performance of electronics over time, turbulence of the milk affecting data, change in sensor output with temperature, or the difficulty of creating a consistent and isolated optical environment in an inline process. According to some experiments, temperature changes may have the strongest correlation that contributes to sensor drift.

Therefore, there are need for a sensor device that is capable of accurately measuring the fat content of raw milk as a part of current processes at a dairy farm while overcoming some or all of the challenges discussed above.

BRIEF SUMMARY

A first aspect of this disclosure pertains to an optical sensor including a channel configured to have a fluid flow therethrough; a light source provided on a first side of the channel; a first light detector provided on the first side of the channel; and a second light detector provided on a second side of the channel.

A second aspect of this disclosure pertains to the optical sensor of the first aspect, wherein the channel is defined by a first transparent plate provided on the first side and a second transparent plate provided on the second side.

A third aspect of this disclosure pertains to the optical sensor of the second aspect, wherein the light source and the first light detector are provided behind the first transparent plate.

A fourth aspect of this disclosure pertains to the optical sensor of the third aspect, wherein the second light detector is provided behind the second transparent plate.

A fifth aspect of this disclosure pertains to the optical sensor of the second aspect, wherein the first transparent plate and the second transparent plate are separated by one or more spacers, wherein a width of the one or more spacers defines a width of the channel.

A sixth aspect of this disclosure pertains to the optical sensor of the first aspect, wherein the channel, the light source, the first light detector, and the second light detector are each provided at a sensing portion of the optical sensor, wherein the sensing portion is adapted to be submerged in the fluid.

A seventh aspect of this disclosure pertains to the optical sensor of the first aspect, wherein the light source and the first light detector are encased in a first housing and the second light detector is enclosed in a second housing, wherein the first housing and the second housing defines the channel.

An eighth aspect of this disclosure pertains to the optical sensor of the seventh aspect, wherein the first housing and the second housing are each transparent or translucent.

A ninth aspect of this disclosure pertains to the optical sensor of the seventh aspect, wherein the first housing and the second housing are each made from a food-safe plastic.

A tenth aspect of this disclosure pertains to the optical sensor of the first aspect further includes a light blocker configured to isolate the first light detector from the light source.

An eleventh aspect of this disclosure pertains to the optical sensor of the first aspect further includes a wave-guiding block configured to direct light to the first light detector or the second light detector.

A twelfth aspect of this disclosure pertains to the optical sensor of the first aspect, wherein the channel includes a first end having a first width and a second end having a second width, wherein the first width is different from the second width.

A thirteenth aspect of this disclosure pertains to the optical sensor of the twelfth aspect, wherein the first width is wider than the second width.

A fourteenth aspect of this disclosure pertains to the optical sensor of the first aspect, wherein the light source includes a plurality of light sources.

A fifteenth aspect of this disclosure pertains to the optical sensor of the fourteenth aspect, wherein some or all of the plurality of light sources are configured to emit light of a same color.

A sixteenth aspect of this disclosure pertains to the optical sensor of the fourteenth aspect, wherein the plurality of light sources includes at least one red light source, one blue light source, and one green light source.

A seventeenth aspect of this disclosure pertains to the optical sensor of the first aspect further including a housing to be provided inline with a pipe for the fluid, the housing including a first pipe end and a second pipe end such that the fluid enters the optical sensor through the first pipe end and exits the optical sensor through the second pipe end.

An eighteenth aspect of this disclosure pertains to the optical sensor of the seventeenth aspect, wherein the housing further includes a conduit surrounding a sensing portion that includes the channel, the light source, the first light detector, and the second light detector.

A nineteenth aspect of this disclosure pertains to the optical sensor of the first aspect further including a first light pipe provided on the first side for directing light emitted from the light source to the channel; and a second light pipe provided on the second side for directing light from the channel to the second light detector.

A twentieth aspect of this disclosure pertains to the optical sensor of the nineteenth aspect further including a third light pipe provided on the first side for directing light from the channel to the first light detector, wherein the first light pipe and the third light pipe are provided concentrically to one another.

Figure 1:
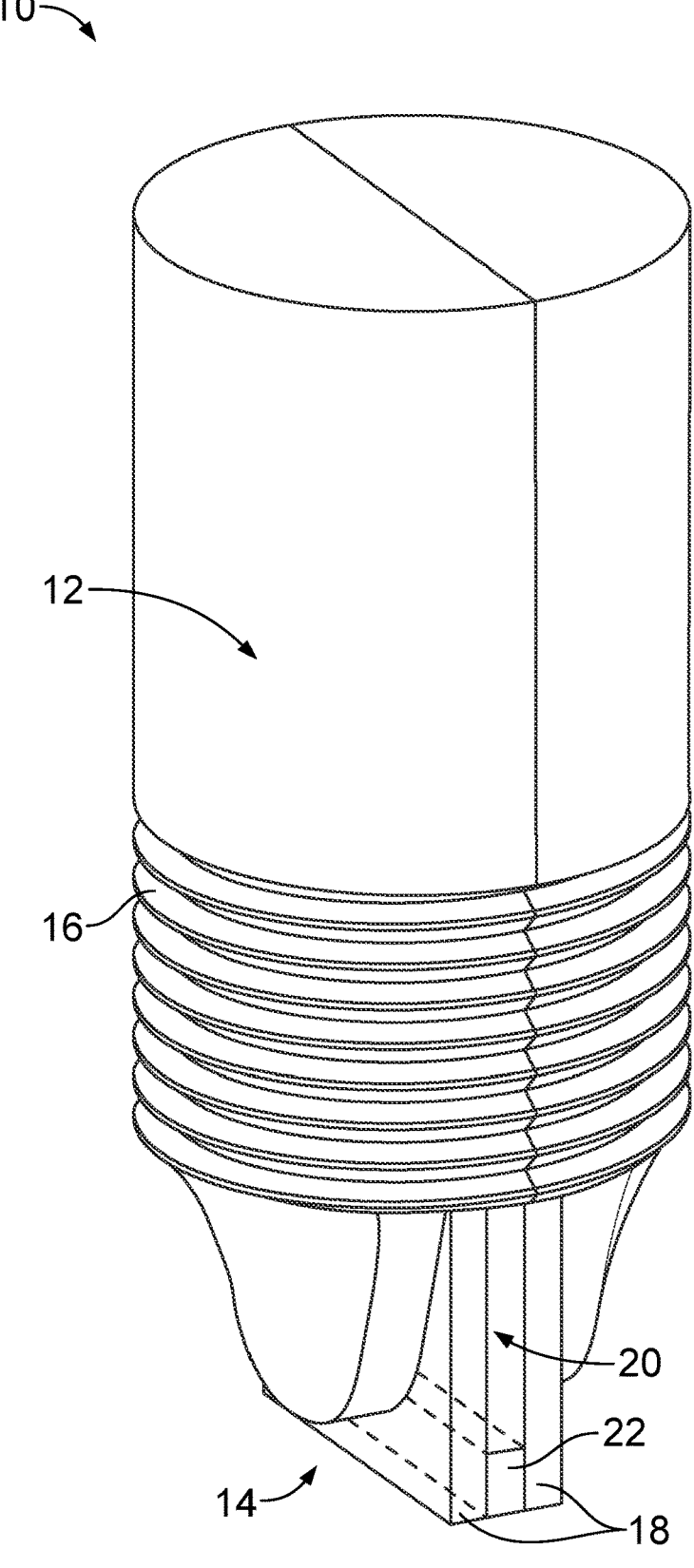
FIG. 1 illustrates a perspective view of a sensor according to an embodiment.

Before explaining the disclosed embodiment of this disclosure in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible to embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

As shown in FIGS. 1-11, the embodiments of this disclosure include a sensor. Referring to FIG. 1, a sensor 10 may include a housing 12 with a sensing portion 14 that may be configured to insert into a port or an opening in a pipe or other fluid-conveying conduits such that the sensing portion may be wholly or partially submerged in a fluid. The housing 12 may include a threaded portion 16 for engaging with or be fastened to a threaded port such that the sensor 10 may be easily attached and/or detached from such a port.

The sensing portion 14 may include two transparent plates 18 separated by a channel 20 defined by a "thin" gap. The transparent plates 18 may be made of transparent or translucent materials such as a food-safe plastic such as PEEK. The distance between the two transparent plates 18 (i.e., the width of the channel 20) may be between about 0.01 millimeters (mm) to about 10 mm, between about 0.1 mm to about 5 mm, between about 0.5 mm to about 2.5 mm, and about 1 mm. Raw milk or other fluids may flow through the channel 20 between the two transparent plates 18 for the milk to be analyzed.

One or more spacers 22 may be provided between the transparent plates 18 and sandwiched therein to help set and keep the transparent plates 18 a desired distance apart. The spacers 22 may be modular and/or interchangeable so that the transparent plates 18 may be adjusted and set to different distances apart. The spacers 22 may be a variety of shapes such as rectangular, cylindrical, and/or other suitable shapes to create the desired width of the channel 20.

Figure 2:
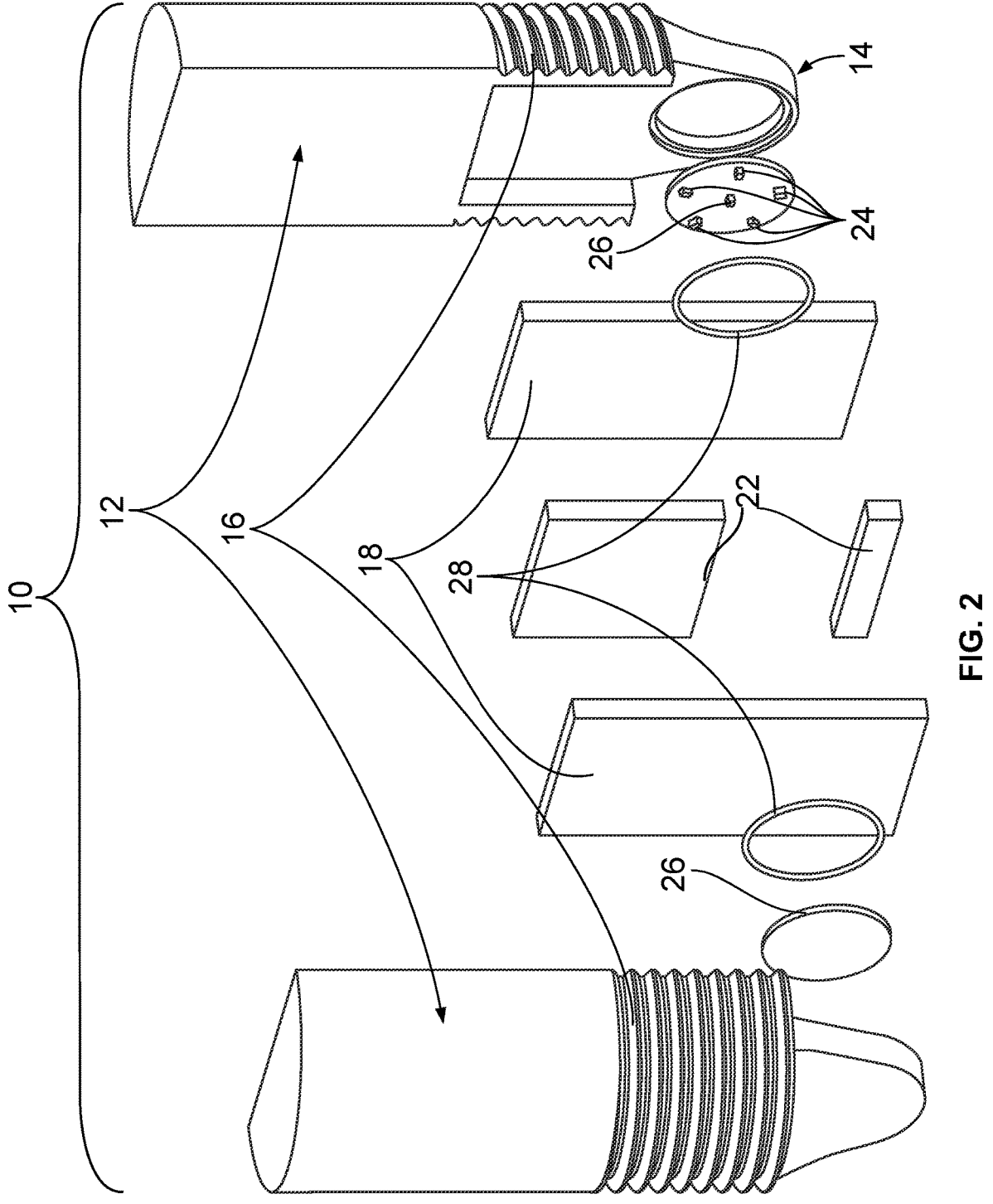
FIG. 2 illustrates an exploded perspective view of the sensor of FIG. 1.

Turning to FIG. 2, the sensor 10 is illustrated in an exploded view. The sensing portion 14 may include one or more light sources 24 located behind one of the transparent plates 18. The light sources 24 may be in the form of such as light-emitting diodes (LEDs), colored LEDs, lasers, or other light-emitting devices that are configured to emit light that may be detected by light detectors 26. In some embodiments, some or all of the light sources 24 may be of a same color. In some embodiments, the light sources 24 include at least one red light source, at least one blue light source, and at least one green light source, where each may be a colored LED.

The light detectors 26 may be placed behind both transparent plates 18 such that a first light detector 26 may be provided on a first side of the channel 20 opposite from the light sources 24, and a second light detector 26 may be provided on a second side of the channel 20 that is on the same side as the light sources 24, such that the light detectors 26 may detect both the transmittance and reflectance of the emitted light through the milk in the channel 20.

The light sources 24 and the light detectors 26 on the second side of the channel 20 may be arranged such that the light detector 26 is centrally located, and the light sources 24 may be evenly spaced around and/or within the light detector 26. For example, in an embodiment, the light sources 24 may be surrounded by the light detector 26 on the same side. In another embodiment, the light sources 24 may surround the light detector 26 on the same side. In yet another embodiment, some of the light sources 24 may be surrounded by the light detector 26 and some of the light sources 24 may surround the light detector 26. Of course, other arrangements are also possible to achieve desired interactions between the light sources 24 and light detector 26 and are contemplated herein. One or more seals 28 (such as O-rings) may be provided to seal the light sources 24 and light detectors 26 from the milk flow.

In operation, raw milk may flow through the channel 20 between the transparent plates 18 in the sensing portion 14. Due to the minimal distance between the transparent plates 18, a thin "slice" of the raw milk may be analyzed, which may overcome the challenges associated with high turbidity. The light sources 24 may emit light or shine light through this thin "slice" of raw milk and the light detectors 26 on either side of the channel 20 may detect and measure the reflectance and transmittance of the milk. Since the "slice" of raw milk analyzed is thin, the slice of raw milk may appear translucent, rather than opaque as may be the case with thicker "slices" of raw milk. The translucency of the milk may change in relation to changes in milkfat content and other properties of the milk when the thin "slice" is analyzed, whereas for a thicker "slice," the raw milk may appear opaque regardless of the fat content. Thus, the distance between the transparent plates 18 may be tuned to target the milkfat content range where the highest measurement resolution is desired.

To account for nonfat particulates such as proteins, reflectance and transmittance may be measured at multiple frequencies and processed algorithmically. Measurements may be taken in the ultraviolet, visible spectrum, infrared, and/or a combination thereof to determine overall color and composition of the milk, and may be used to analyze factors additional to milkfat such as protein composition and associated cow health. Certainly, other light spectrums are also contemplated and within the scope herein.

As an example of how multi-color measurement allows accounting for protein content, consider the following example. In summer, cows might produce milk with a transmittance value of about 0.5 for red, green, and blue light. Then, in autumn, the sensor 10 may detect that transmittance of red light has decreased to about 0.3, while blue and green transmittance remain about the same. Because it is known that a protein that absorbs red light exists and is sometimes produced by cows, the sensor 10 is thus able to determine that the milkfat content remains about the same and that the protein is now being produced. Each protein that may affect readings possesses a unique spectral signature that may be compared against baseline calibration data and factored out, and adding more measurement colors may increases an accuracy of this factoring.

The combination of transmittance and reflectance data gives some protection against the challenge of sensor fouling and drift (such as fouling or drift of the light sources 24, light detectors 26, transparent plates 18, or other sensing components of the sensor 10). For example, a decline in the light sources 24 brightness output over time may normally present a issue for other turbidity sensors. But if a drop in both transmittance and reflectance is observed by the sensor 10 simultaneously, the sensor 10 may determine that such a drop is due to a normal decline of the light sources 24, because an increase in turbidity normally corresponds to an increase in reflectance and a decrease in transmittance. This conclusion can further be corroborated by using multiple light sources 24. In some embodiments, the light sources 24 may include a plurality of light sources having the same color to compare performance against. In some embodiments, the light detectors 26 may be provided at multiple distances to account for one or more light detectors 26 fouling.

To account for bubbles present in the flow, the sensor 10 may be calibrated under the conditions it is intended to be used in. Moreover, multiple readings may be taken and averaged to give each data point reported. For example, the sensor 10 may be configured to take multiple measurements over a time period (such as 0.5 seconds, 1 second, 3 seconds, etc), where the measurements may be averaged to counter potential issues such as large bubbles drifting by that might affect data accuracy.

In some embodiments, it may be sufficient for the sensor 10 to measure only transmittance or reflectance of the raw milk. In other embodiments, both transmittance and reflectance may be measured to further increase accuracy.

The sensor 10 may be used on fluids other than raw milk, and may be used to determine color as well as turbidity. For example, the sensor 10 may be used in pasteurized milk, brews such as beer, wine, spirit, juice, or other types of liquids. In milk sensing, the sensor 10 may be configured to determine additional properties such as a concentration of various proteins or impurities. Determination of protein content may be used to monitor cow health.

Figures 3, 4:
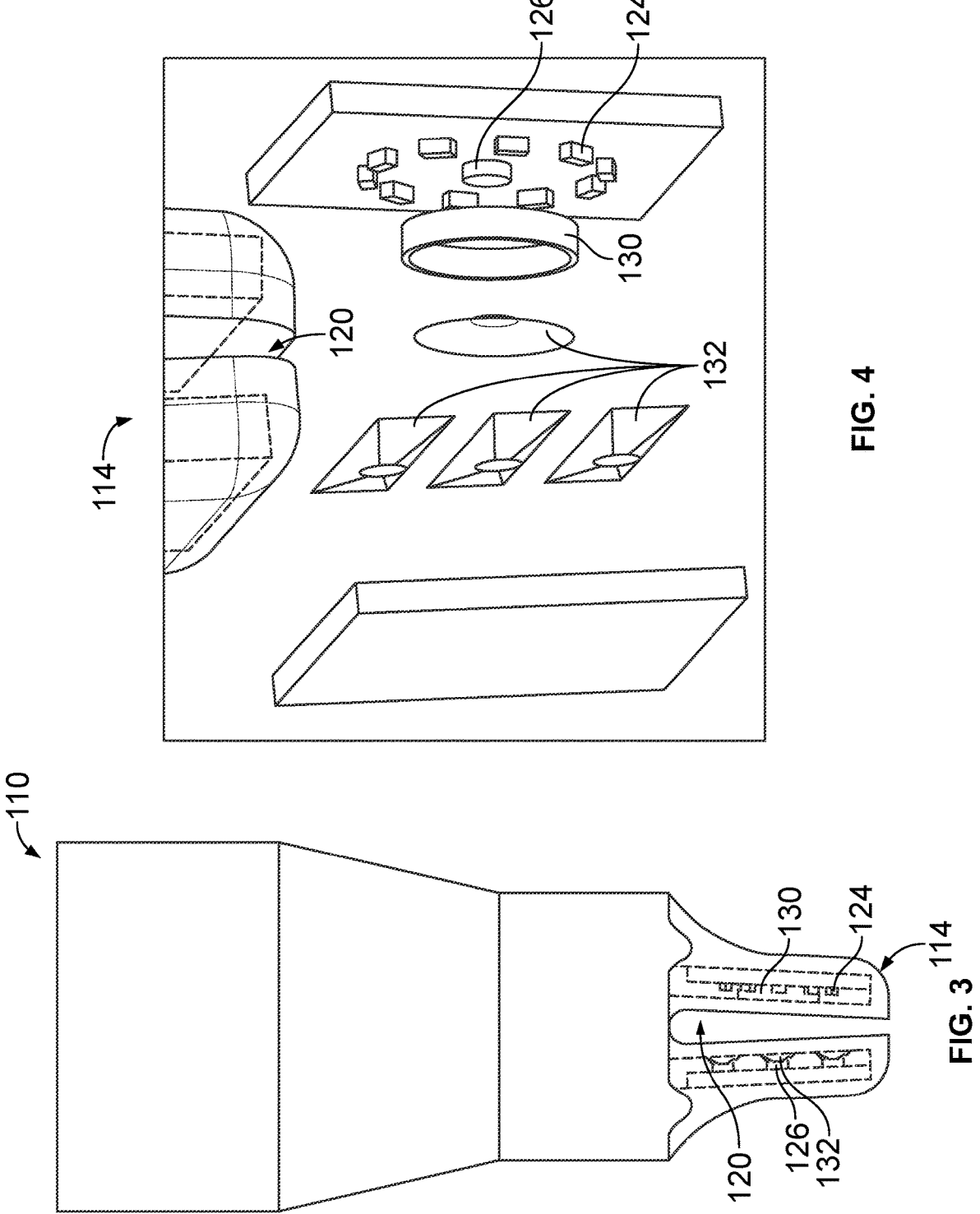
FIG. 3 illustrates a partial side view of a portion of a sensor according to another embodiment.
FIG. 4 illustrates a partially exploded perspective view of the sensor of FIG. 3.
Figure 5:
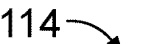
FIG. 5 illustrates another partially exploded perspective view of the sensor of FIG. 3.

Returning to the figures, FIGS. 3-5 illustrate a sensor 110 according to another embodiment. Features that are similar to the sensor 10 shown in FIGS. 1 and 2 are identified with similar reference numbers, plus 100. Some similarities and differences between the sensor 110 and the sensor 10 are described herein.

The sensor 110 may include optical elements, such as light sources 124 and light detectors 126, encased in a transparent or translucent housing that forms the sensing portion 114 of the sensor 110. In some embodiments, the transparent or translucent housing may be made of a material such as a food-safe plastic such as PEEK. The monolithic construction may give this embodiment an advantage of being especially well-sealed.

As illustrated in FIGS. 4 and 5, the optical elements may further include a light blocker 130 that may isolate a light detector 126 from the light sources 124 located on the same side of a channel 120 to ensure the isolated light detector 126 only detects light from the light sources 124 that is reflected by the milk in the channel 120. Waveguiding blocks 132 may also be provided to better direct light to the light detectors 126. The waveguiding blocks 132 may be constructed from epoxy resin.

To allow for better sensor fouling or drift detection, self-diagnosis, and measurement of a wider turbidity range, the channel 120 may be angled such that the light passes through a different amount of milk to reach each light detector 126 that is positioned opposite the channel 120 from the light sources 124. As illustrated in FIG. 3, a top end of the channel 120 may have the widest width, and tapers toward a bottom such that a bottom end of the channel may have the narrowest width. In other embodiments, the top end of the channel 120 may have the narrowest width and the bottom end of the channel 120 may have the widest width. In other embodiments, the channel 120 may have an hourglass shape or other shapes with varying width. In further embodiments, the channel 120 may have a substantially uniform width.

During normal usage, the fraction of light reaching each light detectors 126 may be determined from initial calibration. Because the distance between each light sources 124 and each light detectors 126 is known, if the fraction of light reaching each light detectors 126 changes, the degree of fouling or light sources 124 declines can be determined. Multiple light sources 124 of a same color may also be included as an additional reference point for added stability. While most sensors of this type would need to be recalibrated periodically to account for various factors such as fouling or drift, the sensor 110 can be configured to be self-correcting.

Figure 6:
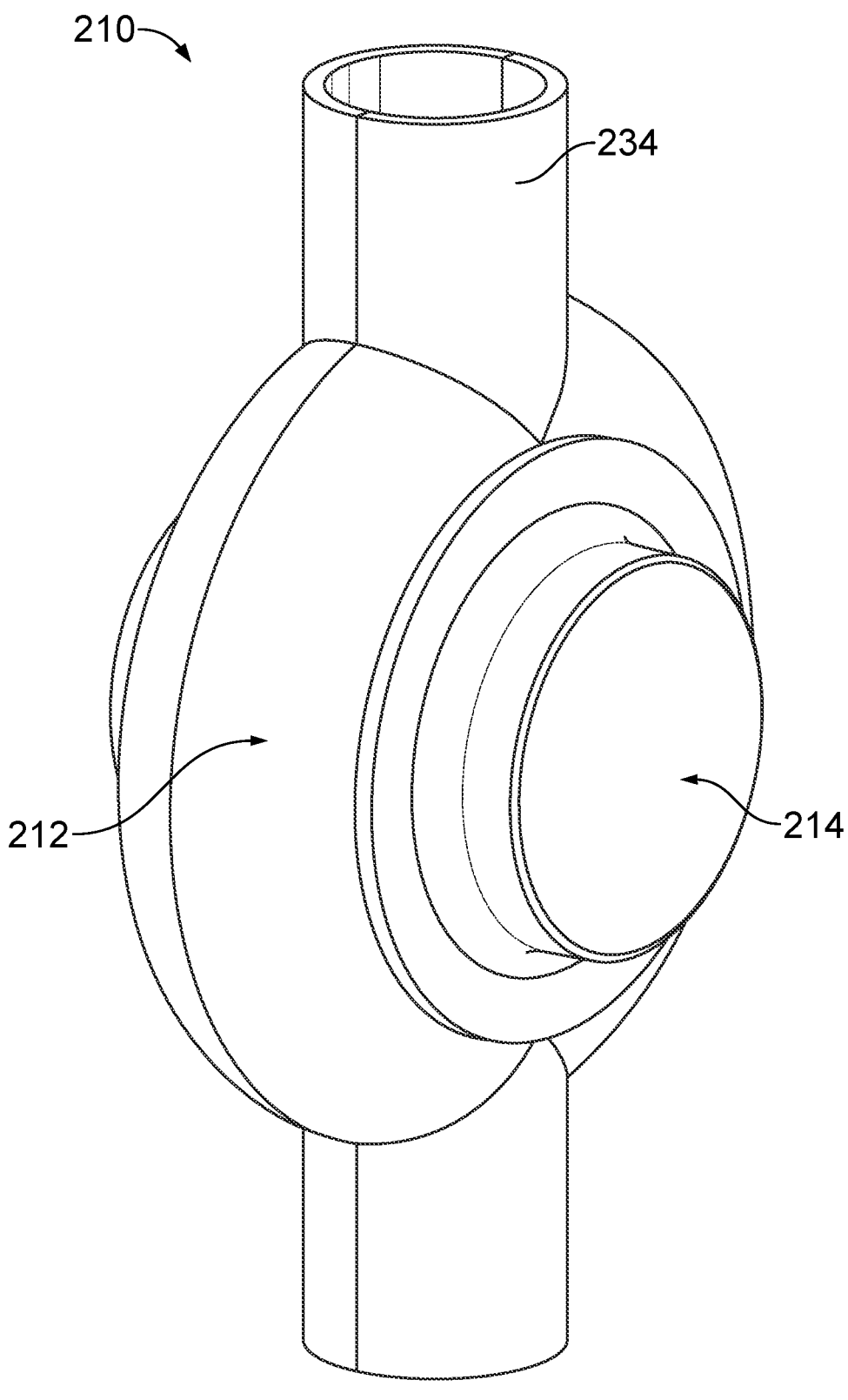
FIG. 6 illustrates a perspective view of a sensor according to another embodiment.
Figure 7:
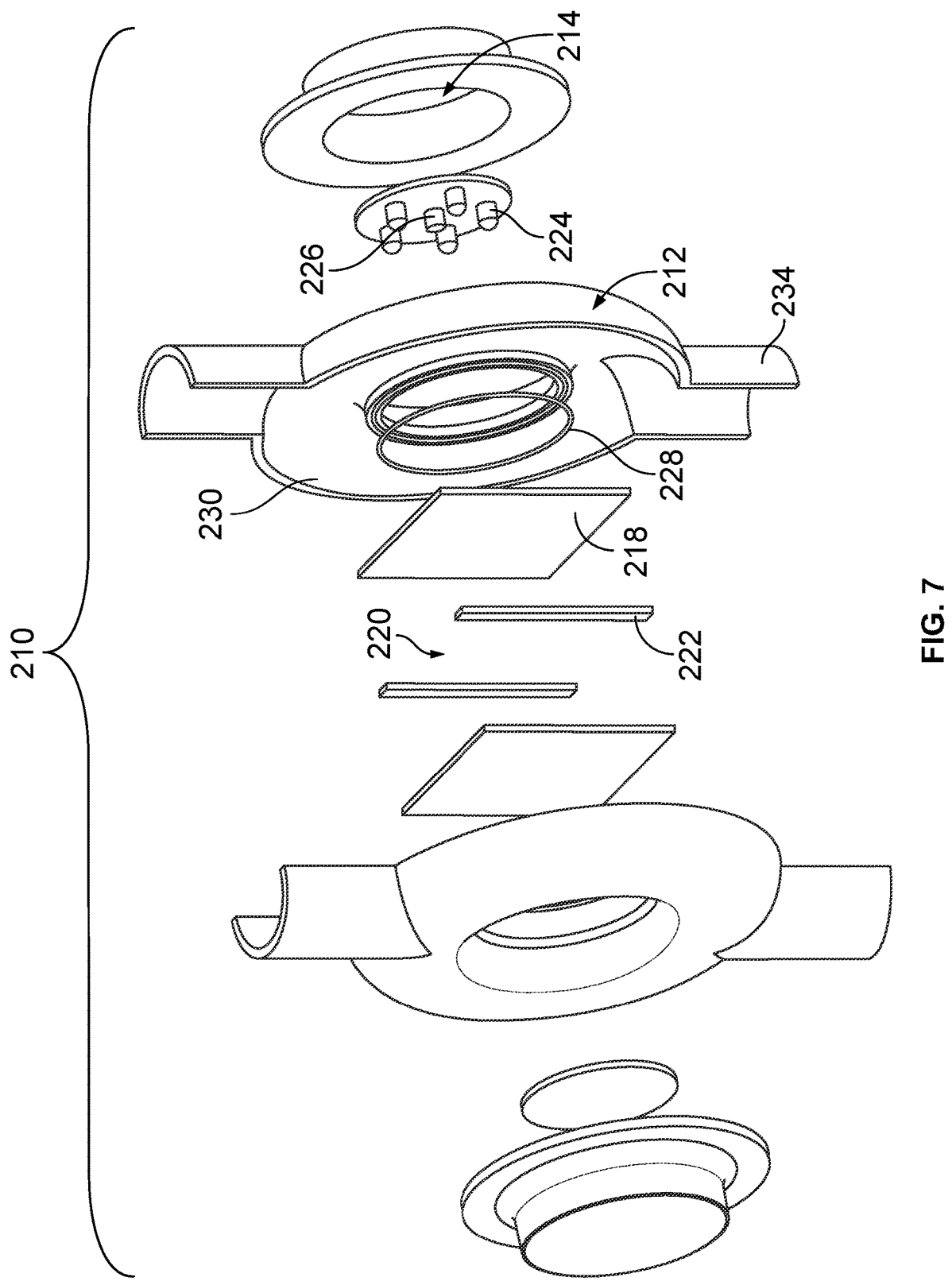
FIG. 7 illustrates a partially exploded perspective view of the sensor of FIG. 6.
Figure 8:
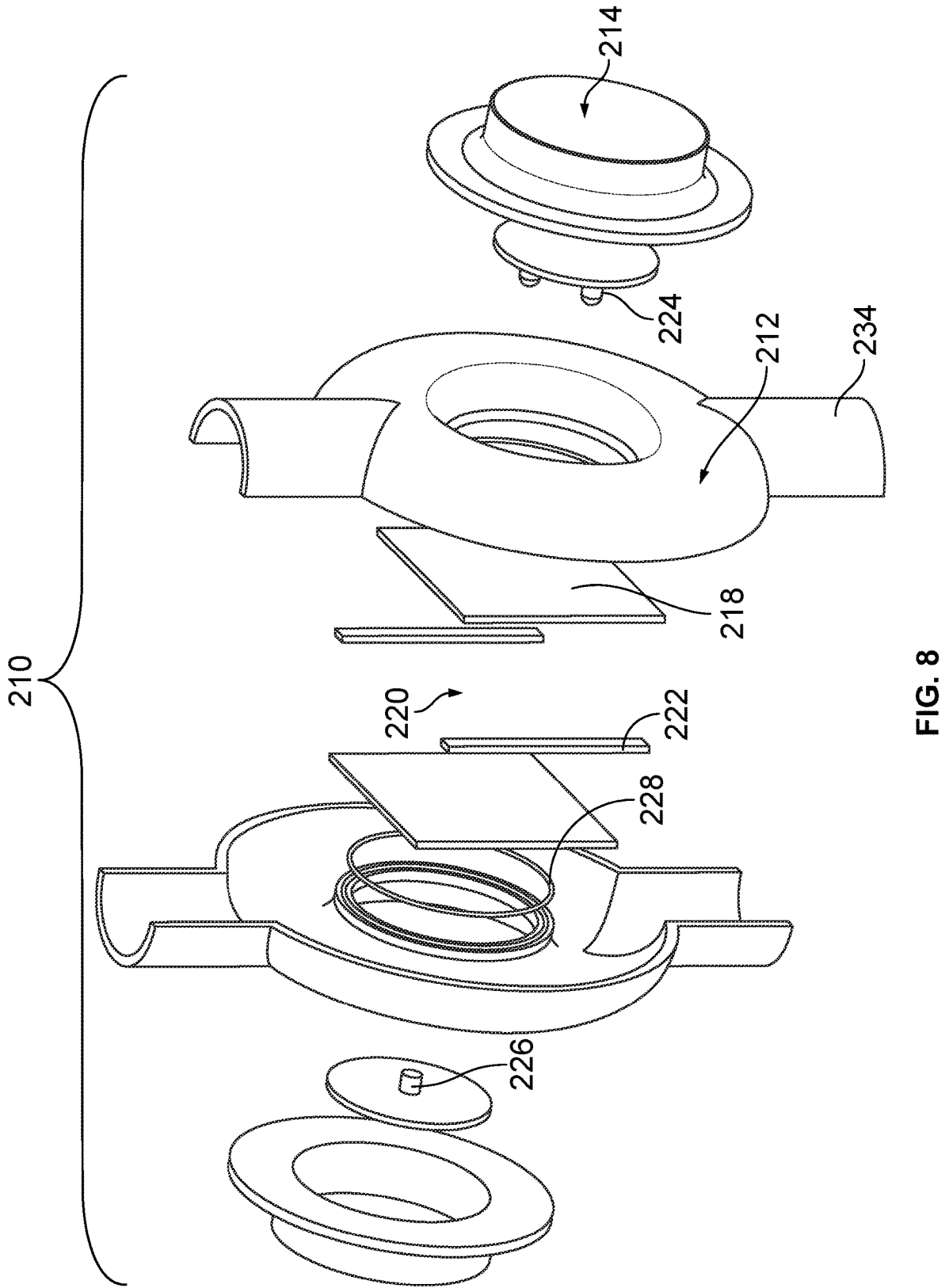
FIG. 8 illustrates another partially exploded perspective view of the sensor of FIG. 6.

FIGS. 6-8 illustrate a sensor 210 according to another embodiment. Features that are similar to the sensor 10 shown in FIGS. 1 and 2 are identified with similar reference numbers, plus 200. Some similarities and differences between the sensor 210 and the sensor 10 are described herein.

As illustrated in FIGS. 6-8, the sensor 210 may be positioned inline with a section of a pipe. As such, the sensor 210 may include pipe ends 234 on either side of a housing 212 that the milk flows through.

A sensing portion 214 may be positioned in a central portion of the housing 212. The sensing portion 214 may include two transparent plates 218 separated by spacers 222 to create a channel 220. The sensing portion 214 may be surrounded by a conduit 230 formed by the housing 212. The milk may flow through the channel 220 as well as through the conduit 230 around the sensing portion 214 in the housing 212. Seals 228 (such as O-rings) may be provided to seal light sources 224, light detectors 226, and any other optical elements from the milk. Alternatively or additionally to using two transparent plates 218, optical elements may be encased in a transparent molding similar to as described with reference to sensor 110. Configurations of the sensor 210 may have the advantage of establishing a consistent optical environment for the sensing portion 214 that is not affected by factors such as the diameter and/or reflectiveness of the surrounding pipe.

Figure 9:
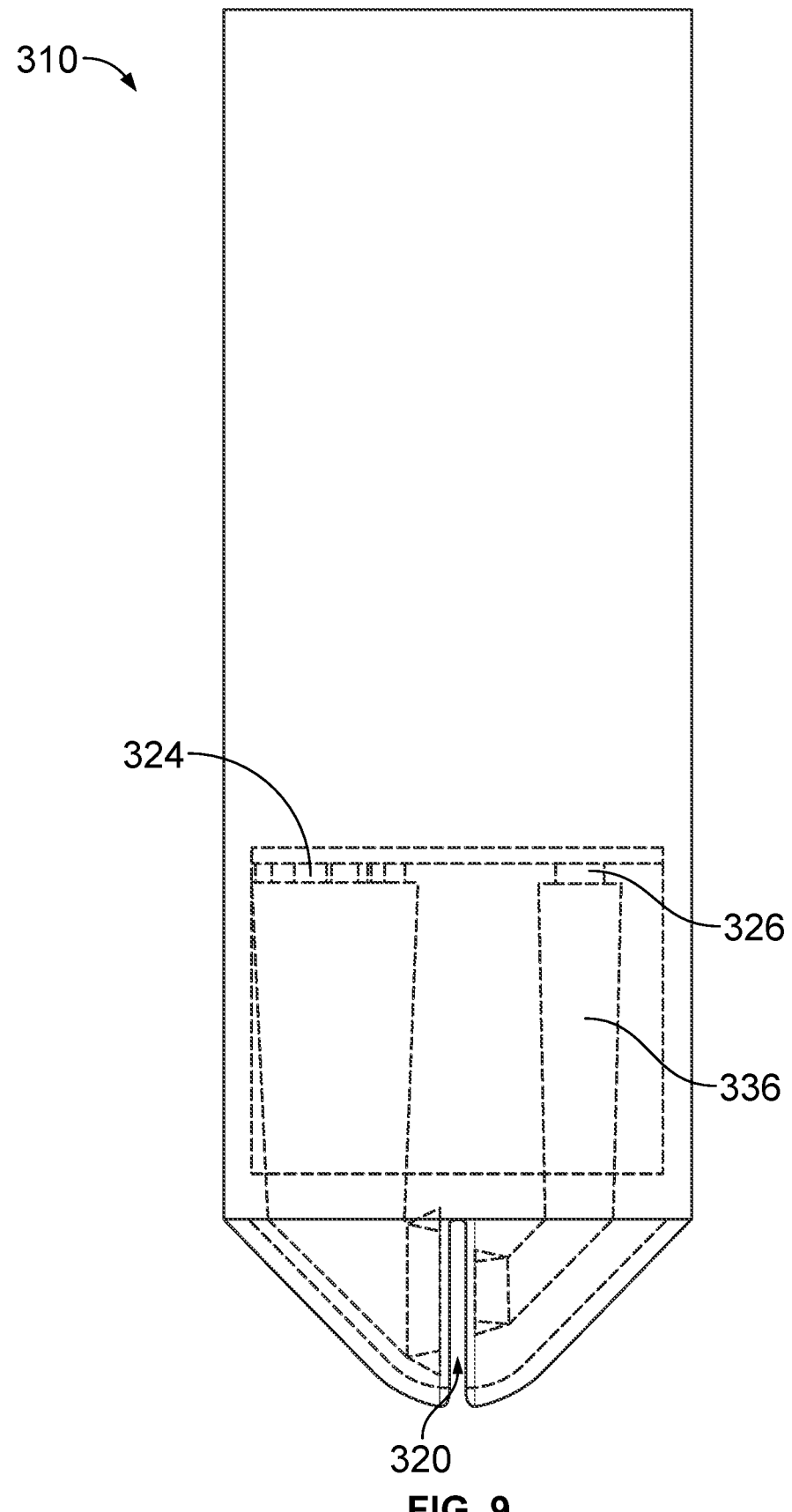
FIG. 9 illustrates a partial side view of a portion of a sensor, with internal features shown in dashed lines, according to another embodiment.
Figures 10, 11:
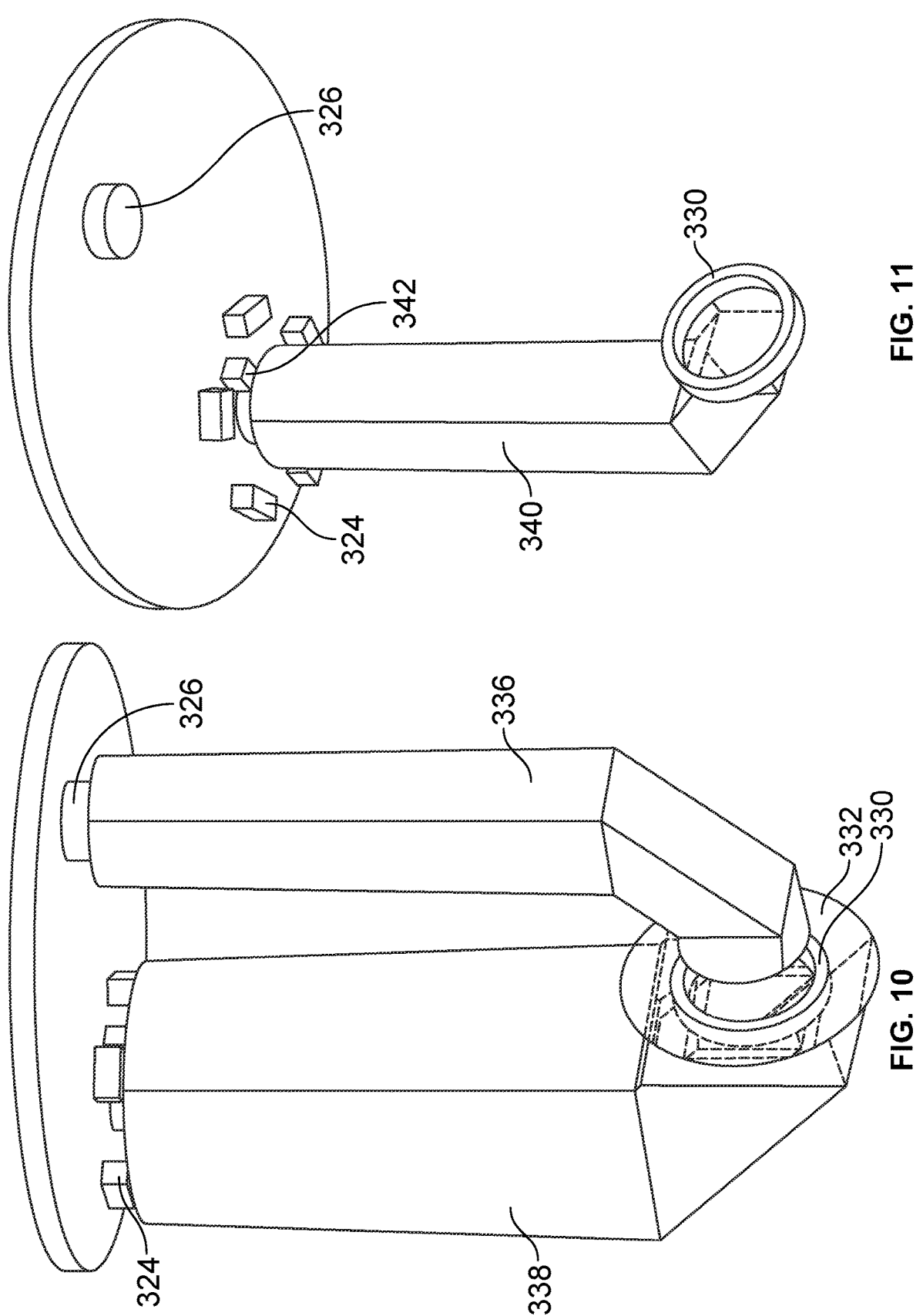
FIG. 10 illustrates a perspective view of a portion of the sensor of FIG. 9.
FIG. 11 illustrates a perspective view of the portion of the sensor of FIG. 10 with some components removed.

FIGS. 9-11 illustrate a sensor 310 according to another embodiment. Features that are similar to the sensor 10 shown in FIGS. 1 and 2 are identified with similar reference numbers, plus 300. Some similarities and differences between the sensor 310 and the sensor 10 are described herein.

As illustrated in FIGS. 9-11, the sensor 310 may position certain optical elements, such as the light sources 324 and light detectors 326 some distance away from a channel 320 through which the milk to be analyzed flows through.

Some optical elements, such as a light blocker 330 and/or waveguiding blocks 332, may be encased in a transparent or translucent material that forms the boundaries of the channel 320. The transparent or translucent material may be a food-safe plastic such as PEEK.

The sensor 310 may include light pipes 338 that may carry or direct light emitted by the light sources 324 to the milk on a first side of the channel 320 and back through the light pipes 336 positioned on a second side of the channel 320 to the light detectors 326. In such embodiments, additional freedom of design and applications may be afforded through using light pipes 336, 338. For example, the sensor 310 may be especially suitable where the fluid is too hot for electronics, where large light sources such as UV lamps are desired, or to improve light dispersion. The light pipes 336, 338 may have mirrored surfaces to carry and direct the light.

On the first side of the channel 320 that includes the light sources 324, an outer light pipe 338 (as illustrated in FIGS. 9 and 10) may be provided to carry the light emitted by the light sources 324 to the channel 320. An inner light pipe 340 may further be provided and positioned within the outer light pipe 338 to carry the reflected light back to the light detectors 326 on the first side. The inner pipe 340 and the outer light pipe 338 may be provided concentrically to one another.

In such a configuration, a light blocker 330 may be provided at an opening of the inner light pipe 340 that is open to the channel 320 and the inner light pipe 340 may totally encapsulate the light detectors 326 to isolate the light detectors 326 from the light sources 324. In addition to having a mirrored inner surface, the inner light pipe 340 may also have a mirrored outer surface to reduce absorption or loss of light when the light travels in the outer light pipe 338. In further embodiments, positions of the light sources 324 and the light detectors 326 may be flipped such that the inner light pipe 340 may encapsulate the light sources 324 and the outer light pipe may carry the light emitted by the light sources 324 back to the light detectors 326.

As illustrated in FIG. 11, a thermistor 342 or other temperature measuring devices may be provided in the sensor 310 to measure temperature changes, which can be compensated for algorithmically to ensure better accuracy in analyzing the fluid properties. The thermistor 342 may be provided proximal to the channel 320 or proximal to the other optical elements and may be incorporated in any embodiments of the sensor described herein.

The sensors 10, 110, 210, 310 described herein may also include having the light sources 24, 124, 224, 324 configured to emit light at near-infrared wavelength, such as between 750 and 1,300 nanometer (nm). In some embodiments, the light sources 24, 124, 224, 324 may be configured to emit light at a mid-infrared wavelength such as between 1,300 and 3,000 nm. In further embodiments, the light sources 24, 124, 224, 324 may be configured to operate at a far-infrared wavelength such as between 3,000 nm and 1 micrometer ($\mu$m). The light source 24, 124, 224, 324 may further be configured to provide adequate luminance such that absorption of the light by the fluid can be registered.

Specific embodiments of an optical sensor according to this disclosure have been described for the purpose of illustrating the manner in which the invention can be made and used. Among other advantages, the disclosed optical sensor is expected to have an improved ability to measure properties of high turbidity fluids, improved reliability and resistance to fouling and drift, and improved accuracy of measurements. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. An optical sensor, comprising:
    a channel configured to have a fluid flow therethrough;
    a plurality of light sources provided on a first side of the channel;
    a first light detector provided on the first side of the channel, at least some of the plurality of light sources surrounding the first light detector on the first side of the channel; and
    a second light detector provided on a second side of the channel.

2. The optical sensor of claim 1, wherein the channel is defined by:
    a first transparent plate provided on the first side; and
    a second transparent plate provided on the second side.

3. The optical sensor of claim 2, wherein the plurality of light sources and the first light detector are provided behind the first transparent plate.

4. The optical sensor of claim 3, wherein the second light detector is provided behind the second transparent plate.

5. The optical sensor of claim 2, wherein:
    the first transparent plate and the second transparent plate are separated by one or more spacers; and a width of the one or more spacers defines a width of the channel.

6. The optical sensor of claim 1, wherein:

the channel, plurality of light sources, the first light detector, and the second light detector are each provided at a sensing portion of the optical sensor; and the sensing portion is adapted to be submerged in the fluid.

7. The optical sensor of claim 1, wherein:

the plurality of light sources and the first light detector are encased in a first housing and the second light detector is enclosed in a second housing; and the first housing and the second housing define the channel.

8. The optical sensor of claim 7, wherein the first housing and the second housing are each transparent or translucent.

9. The optical sensor of claim 7, wherein the first housing and the second housing are each made from a food-safe plastic.

10. The optical sensor of claim 1, further comprising a light blocker configured to isolate the first light detector from the plurality of light sources.

11. The optical sensor of claim 1, further comprising a waveguiding block configured to direct light to the first light detector or the second light detector.

12. The optical sensor of claim 1, wherein:

the channel includes a first end having a first width and a second end having a second width; and the first width is different from the second width.

13. The optical sensor of claim 12, wherein the first width is wider than the second width.

14. The optical sensor of claim 1, wherein some or all of the plurality of light sources are configured to emit light of a same color.

15. The optical sensor of claim 1, wherein the plurality of light sources includes at least one red light source, one blue light source, and one green light source.

16. The optical sensor of claim 1, further comprising a housing to be provided inline with a pipe for the fluid, the housing comprising a first pipe end and a second pipe end such that the fluid enters the optical sensor through the first pipe end and exits the optical sensor through the second pipe end.

17. The optical sensor of claim 16, wherein the housing further comprises a conduit surrounding a sensing portion that includes the channel, the plurality of light sources, the first light detector, and the second light detector.

18. The optical sensor of claim 1, further comprising:

a first light pipe provided on the first side for directing light emitted from the plurality of light sources to the channel; and a second light pipe provided on the second side for directing light from the channel to the second light detector.

19. The optical sensor of claim 18, further comprising:

a third light pipe provided on the first side for directing light from the channel to the first light detector, wherein the first light pipe and the third light pipe are provided concentrically to one another.

* * * * *